United States Patent [19]

Vogel

[11] Patent Number: 6,032,131
[45] Date of Patent: Feb. 29, 2000

[54] SYSTEM AND METHOD FOR ACCURATELY MODELING SPENDING

[75] Inventor: Eric Stefan Vogel, Richardson, Tex.

[73] Assignee: Electronic Data Systems Corporation, Plano, Tex.

[21] Appl. No.: 08/859,239

[22] Filed: May 20, 1997

[51] Int. Cl.[7] .................................................. G06F 17/60
[52] U.S. Cl. ............................................................. 705/30
[58] Field of Search ................................. 705/30, 33, 34, 705/7, 24, 4, 8, 1; 364/578

[56] References Cited

U.S. PATENT DOCUMENTS

| | | | |
|---|---|---|---|
| 5,224,034 | 6/1993 | Katz et al. .................................. | 705/7 |
| 5,237,495 | 8/1993 | Morii ......................................... | 705/8 |
| 5,237,496 | 8/1993 | Kagami et al. ............................ | 705/10 |
| 5,615,109 | 3/1997 | Eder ........................................... | 705/8 |
| 5,787,283 | 7/1998 | Chin et al. ................................. | 395/701 |
| 5,799,289 | 8/1998 | Fukushima et al. ...................... | 705/400 |

Primary Examiner—Tod R. Swann
Assistant Examiner—Matthew Smithers
Attorney, Agent, or Firm—L. Joy Griebenow; Baker & Botts L.L.P.

[57] ABSTRACT

An automated system and method are provided for accurately modeling spending. In the system and method, invoice information and payment information are received at an interface. A processor, coupled to the interface, automatically generates a distribution in response to the invoice information and the payment information. The generated distribution is automatically transformed by the processor. Spend information for a specified period of time is received at the interface; the spend information specifies a spending amount. The processor automatically spreads the spending amount over the transformed distribution.

18 Claims, 5 Drawing Sheets

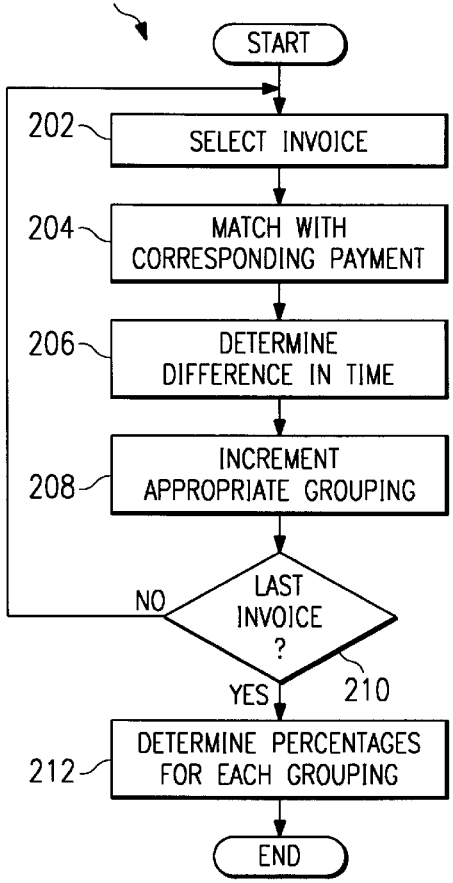
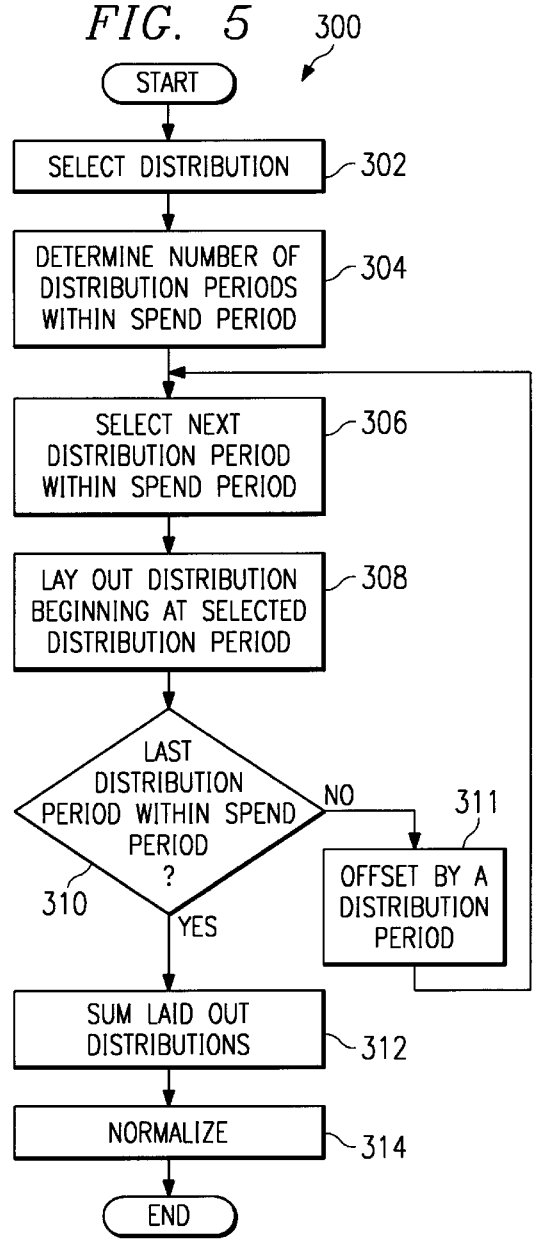
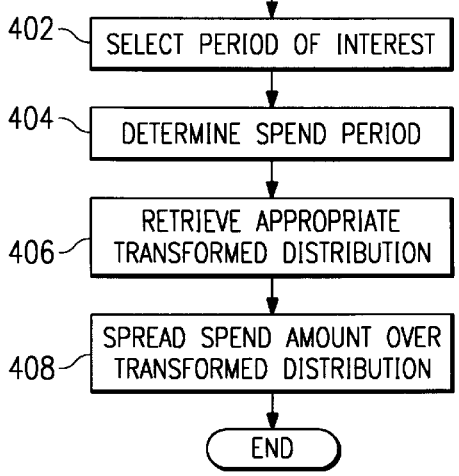

SYSTEM AND METHOD FOR ACCURATELY MODELING SPENDING

TECHNICAL FIELD OF THE INVENTION

This invention relates generally to the field of computer software systems, and more particularly, to a system and method for accurately modeling spending.

BACKGROUND OF THE INVENTION

Any entity which purchases goods and/or services on a regular basis will typically seek to maximize the amount of goods/services that it receives for a particular amount of cash outflow or money. Accordingly, from time to time such an entity may enter into new agreements or renegotiate existing agreements with various suppliers of goods/services in order to obtain the most favorable arrangements for purchasing. In these cases—when an entity has altered its supply arrangements—the entity may wish to measure how much has been saved, or lost, with respect to prior arrangements.

To measure savings, certain assumptions can be made with regard to the difference between an old contract and a new contract. For example, if an old contract stipulates a price of $150.00 per unit for a certain type of services or goods while a new contract stipulates a price of $135.00 per unit for the same type of services/goods, then it could be reasoned that $15.00 will be saved for each unit purchased under the new contract. This translates into a savings of 10% (i.e., 15/150) for each dollar spent on that type of services/goods under the new contract. The savings or benefits in actual dollars may then be derived by determining what amount of money has been spent under the new contract.

Previously developed techniques for determining or assigning an actual dollar amount to the benefit derived from new contractual arrangements, however, suffered from numerous problems. For example, these techniques did not account for the difference in time between the date on which goods and/or services were received and the date on which payment was rendered for the same, thereby producing, in some cases, inaccurate, imprecise, or incorrect conclusions regarding savings. This is more readily explained with reference to FIG. 1.

FIG. 1 illustrates an exemplary time line for various events surrounding the effective date of a new contract or supply arrangement. As shown in FIG. 1, a first set of services (services A) can be provided in the second, third, and fourth weeks of a first month under the old contract, and may be priced at an old contract price of $150.00 per unit. An invoice corresponding to services A is prepared and sent out at the end of a first week of the next (or second) month. If services A comprises ten (10) units, then the monetary amount of the corresponding invoice is $1500.00 ($150.00 per unit×10 units). Payment for this invoice for services A is made approximately thirty days later during the first week of the following or third month. A second set of services (services B) are provided during the first and second weeks of the third month; services B are priced at a new contract price of $135.00 per unit. An invoice for services B is prepared, and then sent out at the end of the second week of the third month. If services B comprises fifteen (15) units, then the monetary amount for this invoice is $2025.00 ($135.00 per unit×15 units). Payment of the invoice for services B is rendered during the third week of the third month. At the end of the third month, a spending report for that month is generated. This spending report may specify a single lump sum of $3525.00 ($1500.00+$2025.00) that represents payment for both services A and services B during the third month.

According to some previously developed techniques for determining the benefit derived from new contractual arrangements, savings were calculated as a straight percentage of a spending report. With reference to the example of FIG. 1, if the new contract becomes effective at the end of the third week of the second month, then prior techniques would calculate that $352.50 (10%×$3525.00) was saved under the new contract. However, this amount is not very accurate because some of the monthly spend amount was attributable to payment for services A, which were priced at the higher rate under the old contract. Thus, because spending reports do not reflect which goods or services were provided prior to the effective date of the new contract (e.g., services A) and which goods or services were provided after such date (e.g., services B), the figure derived under prior techniques could misrepresent actual savings.

From the above, it can be seen that with previous techniques, the flow of spending, and accordingly, savings under a new contract, could not be discerned with any real degree of accuracy. Thus, an entity was not able to determine how much it saved under any new arrangements with a supplier.

SUMMARY OF THE INVENTION

From the foregoing, it may be appreciated that a need has arisen for a system and method for accurately modeling spending so that, among other things, accuracy can be improved in the process of determining how much benefit has been derived from a new supply arrangement.

According to an embodiment of the present invention, an automated method is provided for accurately modeling spending. In the method, invoice information and payment information are received. A distribution is automatically generated in response to the invoice information and the payment information. The generated distribution is automatically transformed. Spend information for a specified period of time is received; the spend information specifies a spending amount. This spending amount is automatically spread over the transformed distribution.

According to another embodiment of the present invention, a system is provided for accurately modeling spending. The system includes an interface which can receive spend information for a specified period of time, invoice information, and payment information. A processor is coupled to the interface. The processor functions to generate a distribution in response to the invoice information and the payment information, transform the generated distribution, and spread a spending amount specified in the spend information over the transformed distribution.

Important technical advantages of the present invention include accurately modeling spending for a particular supplier of goods and/or services over a relevant specified period of time with a time period of resolution finer than that in the spend data. This is accomplished by receiving invoice information and payment information for the supplier. At least one distribution may be generated in response to the invoice and payment information. This distribution may be transformed into one that is suitable for a particular spending period. A spending amount for the relevant specified period of time is spread over the transformed distribution, thus providing an accurate model of spending over the relevant specified period of time. Relative to prior techniques and models, this model of spending according to the present invention can be used to more precisely determine the benefits or losses derived under a contractual arrangement that has become effective during the relevant specified period of time.

Another important technical advantage of the present invention includes generating a frequency distribution for a supplier of goods/services from historical data related to that supplier. In particular, the invention collects invoice information relating to invoices received from the supplier and payment information relating to payments made pursuant to such invoices. For each invoice, the time difference (e.g., in days) between the date on which the invoice was received and the date on which a corresponding payment was made is determined. Separate groupings are provided for various intervals of time. Each instance of an invoice and corresponding payment is placed into one of these groupings after the time difference for such instance has been determined. When all relevant invoice/payment instances have been placed into an appropriate grouping, the percentage of instances contained within each grouping are calculated in order to generate a frequency distribution of the invoice-payment lag for the supplier. Historical data enables the present invention to provide a more accurate model of when money was spent.

Yet another important technical advantage of the present invention includes generating a histogram for each distribution as described above. The histogram graphically depicts the distribution so that a user can readily identify a pattern of invoice-payment lag for the supplier associated with the distribution.

Still another technical advantage of the present invention includes transforming a single distribution multiple times in order to generate a plurality of transformed distributions for different spending periods of time. When a model for spending during a particular period of time is desired, the spending period of that specified period of time is determined and a suitable transformed distribution is retrieved. The transformed distribution can be used in conjunction with a spending amount for the specified period of time to produce a spending model for the same.

Other important technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, in which:

FIG. 4 is a flow chart of an exemplary method for generating a distribution, according to an embodiment of the present invention;

FIG. 5 is a flow chart of an exemplary method for transforming a distribution, according to an embodiment of the present invention;

FIG. 6 is a flow chart of an exemplary method for spreading a spending amount, according to an embodiment of the present invention;

DETAILED DESCRIPTION OF THE INVENTION

Figure 1:
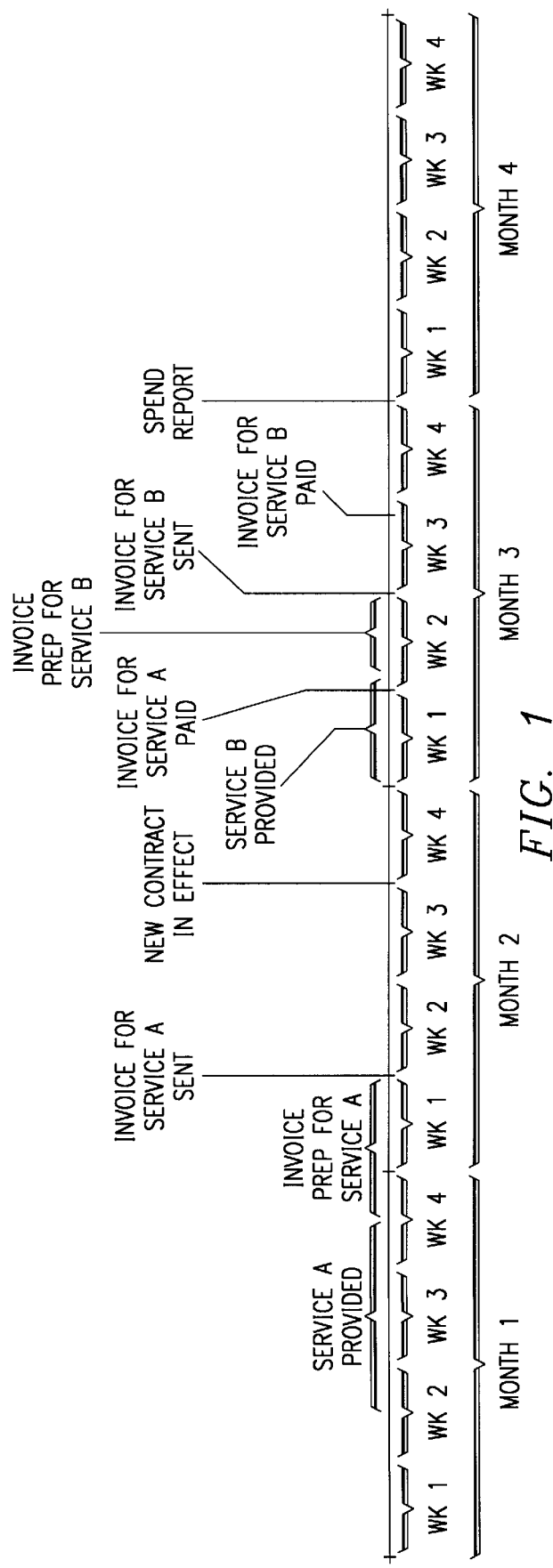
FIG. 1 illustrates an exemplary time line representing a background in which the present invention may operate.

The preferred embodiment of the present invention and its advantages are best understood by referring to FIGS. 1–8E of the drawings, like numerals used for like and corresponding parts of the various drawings.

Turning first to the nomenclature of the specification, the detailed description which follows is represented largely in terms of processes and symbolic representations of operations performed by conventional computer components, such as a central processing unit ("CPU") or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with a human operator or user that interacts with the computer or computers.

In addition, it should be understood that the programs, processes, methods, and the like, described herein are but an example of one implementation of the present invention and are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic programs stored in non-volatile memory, such as read-only memory (ROM).

Figure 2:
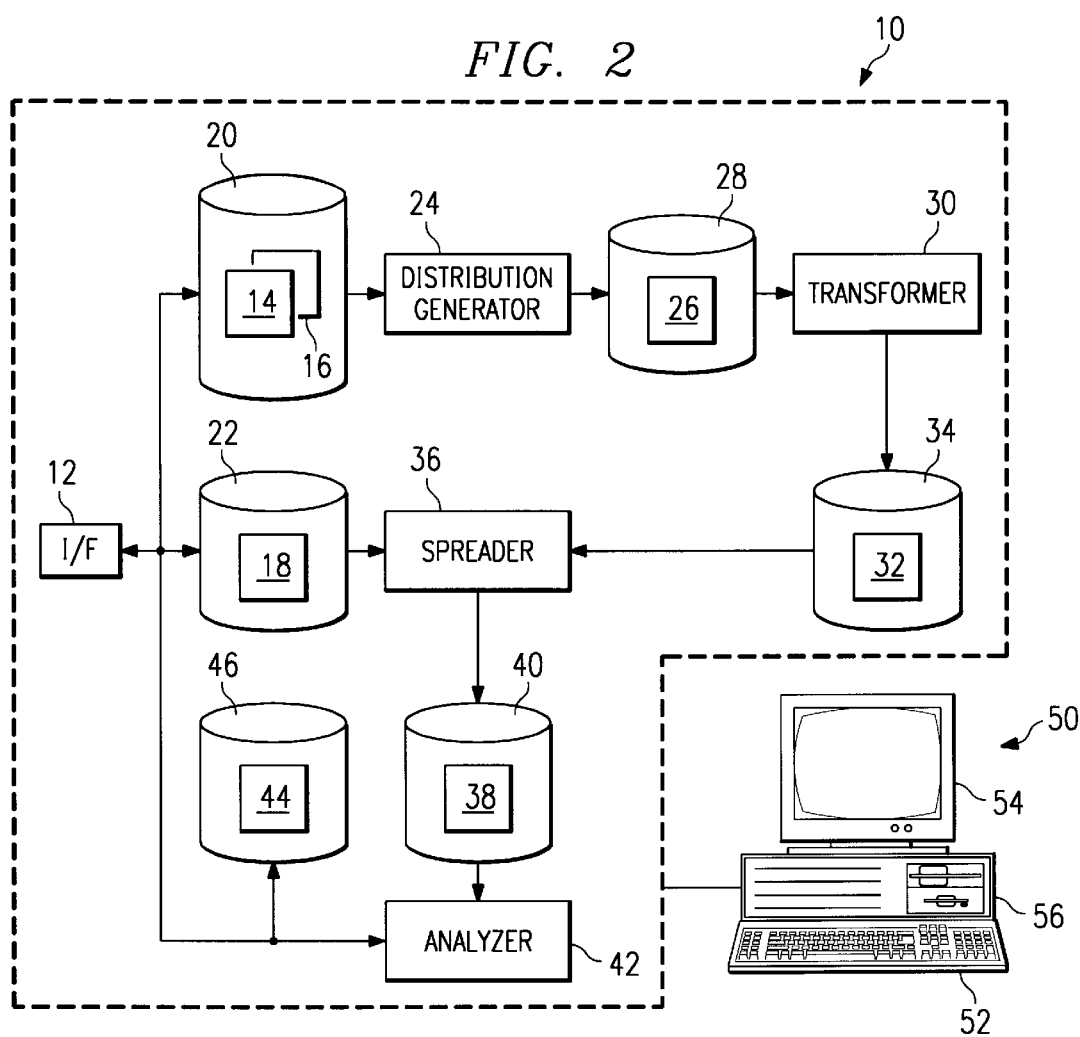
FIG. 2 illustrates an exemplary system for accurately modeling spending, according to an embodiment of the present invention.

Referring now to the drawings, FIG. 2 illustrates a system 10 for accurately modeling spending, according to an embodiment of the present invention. Generally, modeling system 10 may be used to generate an accurate model of spending prior to and after the effective date of a new supply arrangement so that, among other things, benefits under the arrangement can be determined or assessed.

Modeling system 10 includes an interface (I/F) 12, the functionality of which can be performed by one or more suitable input devices, such as a key pad, touch screen, input port, pointing device (e.g., mouse), and/or other device that can accept information, and one or more suitable output devices, such as a computer display, output port, speaker, or other device, for conveying information associated with the operation of modeling system 10, including digital data, visual information, or audio information. In one embodiment, interface 12 may comprise a computer-telephone interface (CTI), or the like, which allows modeling system 10 to communicate with a remote database or computer system, such as a computer maintained by a vendor or supplier. Interface 12 may comprise or be operable to display at least one graphical user interface (GUI) having a number of interactive devices, such as buttons, windows, pull-down menus, and the like, to facilitate the entry, viewing, and/or retrieval of information. Interface 12 may function to receive and forward invoice information 14, payment information 16, and spend information 18. Interface 12 may also function to allow a user of modeling system 10 to interact with the system to input commands or view information.

Invoice information 14 comprises various information relating to any invoices which are received for services and/or goods that have been delivered or provided, such as, for example, to an entity. For each invoice received, invoice information 14 may specify a vendor or supplier submitting the invoice, an invoice number, the services or goods which were provided, the date on which or the dates over which such services or goods were provided, a purchase order number which was submitted as a request for the goods/ services, the date by which payment should be rendered, the amount of money being requested, etc. It should be understood that, in other embodiments, invoice information 14 may include other information in addition to, or instead of, all or a portion of the exemplary information previously described. Invoice information 14 may be input as invoices are submitted by various suppliers; for example, many suppliers submit invoice information 14 on a weekly basis, typically at the end of the week. In one embodiment, invoice information 14 may be input directly into modeling system 10 by the various suppliers. Furthermore, invoice information 14 can be input as batch information.

Payment information 16 comprises various information relating to payments that have been or will be made in response to received invoices. For each payment, payment information 16 may specify, among other things, the supplier to whom payment was made, the date on which payment was made, the amount of the payment, an invoice number for the invoice pursuant to which payment was rendered, etc. It should be understood that, in other embodiments, payment information 16 may include other information in addition to, or instead of, all or a portion of the exemplary information previously described. Typically, payment for a particular invoice occurs at some point in time after such invoice has been received; in one embodiment, payment information 16 may be input or received at modeling system 10 when the actual payments are made to various suppliers.

An invoice/payment information memory 20 is coupled to interface 12. Invoice/payment information memory 20 may reside in a suitable storage medium, such as random access memory (RAM), read-only memory (ROM), disk, tape storage, or other suitable volatile and/or non-volatile data storage system. In one embodiment, invoice/payment information memory 20 comprises a relational database. Invoice/ payment information memory 20 receives, stores, and forwards invoice information 14 and payment information 16. Separate invoice information 14 and payment information 16 can be maintained, and retrieved as necessary, for each invoice or payment, respectively.

Spend information 18 generally includes information relating to the actual moneys that were disbursed or spent by an entity during a particular period of time, such as, for example, the first two weeks of March 1997 or the entire month of November 1996. The duration of each time period—e.g., two weeks, a month, a quarter, six months, a year, etc.—will be referred to hereinafter as its "spending period." For each specified period of time, spend information 18 may specify the dates defining the specified period of time, the spending period of the specified period of time, the amount disbursed or paid out during this period, the suppliers to whom money was disbursed, etc. It should be understood that, in other embodiments, spend information 18 may include other information in addition to, or instead of, the exemplary information previously described. Spend information 18 may be received or input at interface 12 as it is generated or produced; accordingly, input can be weekly, semi-monthly, monthly, quarterly, semi-annually, annually, etc.

A spend information memory 22, coupled to interface 12, functions to receive, store, and forward spend information 18. Spend information memory 22 may reside in a suitable storage medium, such as RAM, ROM, disk, tape storage, or other suitable volatile or non-volatile data storage system. This data storage system can be the same or separate from the data storage system containing invoice/payment information memory 20. Like invoice/payment information memory 20, spend information memory 22 can be a relational database.

A distribution generator module 24 is coupled to invoice/ payment information memory 20. The functionality of distribution generator module 24 can be performed by any suitable processor, such as a main-frame, file server, work station, or other suitable data processing facility running appropriate software. Distribution generator module 24 is operable to retrieve invoice information 14 and payment information 16 from invoice/payment information memory 20.

Distribution generator module 24 generally functions to generate one or more distributions or statistical frequencies which reflect historical patterns. For example, the distributions may reflect the pattern of time differential between the date on which any given invoice is received and the date on which payment is made pursuant to such invoice; such distributions may be referred to as "invoice to payment lag distributions." Alternatively, the distributions may reflect the pattern of time differential between the date on which a monetary unit (e.g., a dollar) is invoiced and the date on which payment is made for the monetary unit; such distributions may be referred to as "invoiced monetary unit to payment lag distributions." The distributions generated by module 24 can be based on events or instances relating to a number of actual invoices and/or monetary units, and payments corresponding to the same. Preferably, each distribution comprises a break down of these instances of invoices and/or monetary units, and corresponding payments, into various groupings where each grouping is associated with a particular lag or interval between the time when an invoice is received and the time when a payment for the invoice is made or, alternatively, each grouping is associated with a particular lag or interval between the time when a monetary unit is invoiced and the time when a payment for the same unit is made.

For an exemplary invoice to payment lag distribution, a first grouping may be defined for any interval between one to seven days from the time when an invoice is received and the time payment is made; a second grouping may be defined for any interval between eight to fourteen days from invoice to payment; and yet a third grouping may be defined for any interval between fifteen to twenty-one days from invoice to payment. Preferably, the period for each interval (a "distribution period") is the same. With reference to the previous example, each interval spans a distribution period of seven days or one week; accordingly, the first grouping should include all instances in which payment was made during the first week after an invoice was received, the second grouping should include all instances in which payment was made during the second week after an invoice was received, and the third grouping should include all instances in which payment was made during the third week, respectively.

Likewise, for an exemplary invoiced monetary unit to payment lag distribution, a first grouping may be defined for any interval between one to seven days from the time when the invoice for a particular dollar is received and the time payment is made for the invoiced dollar; a second grouping may be defined for any interval between eight to fourteen days from invoiced dollar to payment; and yet a third grouping may be defined for any interval between fifteen to twenty-one days from invoiced dollar to payment. The first grouping should include all instances in which payment for an invoiced dollar was made during the first week after an invoice for that dollar was received, the second grouping should include all instances in which payment for an invoiced dollar was made during the second week after an invoice for such dollar was received, and the third grouping should include all instances in which payment for an invoiced dollar was made during the third week, respectively.

The distributions produced by distribution generator module 24 preferably have a time period of resolution that is "finer" or more precise than that associated with the monetary amounts specified in spend information 18. That is, the distribution period of each distribution is preferably shorter than the spending period for a particular time period of interest. This, in part, allows the present invention to produce more accurate or more precise calculations of savings, as explained herein.

For clarity, the remainder of this description will focus primarily on the generation of invoice to payment lag distributions—i.e., distributions reflecting the historical pattern of time differential between the date on which any given invoice is received and the date on which payment is made pursuant to such invoice. It should be understood, however, that the invention is not so limited. For example, invoiced monetary unit to payment lag distributions—i.e., distributions reflecting the historical pattern of time differential between the date on which a particular monetary unit is invoiced and the date on which payment for that monetary unit is made—can be generated in addition to, or instead of, the invoice to payment lag distributions described herein.

In one embodiment, to generate a distribution, distribution generator module 24 is operable to match invoices specified in invoice information 14 to corresponding payments specified in payment information 16. The difference in time—e.g., two days, ten days, eighteen days—between each matched invoice and corresponding payment is determined. Distribution generator module 24 identifies the interval—e.g., one to seven days, eight to fourteen days, fifteen to twenty-one days—within which each time differential lies so that the associated invoice-payment match is placed into an appropriate grouping. When all invoices and payments have been matched and placed into appropriate groupings, distribution generator module 24 calculates what percentage of invoice-payment matches are contained within each grouping. This provides the distribution for the time differential or lag between invoice date and payment date. Preferably, the percentages for all groupings will sum to 100 percent. An exemplary flow chart of a method for this embodiment is illustrated and described below with reference to FIG. 4.

The distributions generated by distribution generator module 24 may be displayed or presented in a graphical form, such as, for example, a histogram as shown and described below in more detail with reference to FIG. 7. A separate distribution may be generated for each supplier from which invoices are received and/or to whom payments are made. The distributions generated by distribution generator module 24 constitute distribution information 26.

A distribution information memory 28 is coupled to distribution generator module 24 and functions to receive, store, and forward distribution information 26. Distribution information memory 28 may reside in a suitable storage medium, such as RAM, ROM, disk, tape storage, or other suitable volatile or non-volatile data storage system, which can be the same or separate from the data storage system(s) containing invoice/payment information memory 20 and spend information memory 22. Distribution information memory 28 may be a relational database.

A transformer module 30 is coupled to distribution information memory 28. The functionality of transformer module 30 can be performed by any suitable processor, such as a main-frame, file server, work station, or other suitable data processing facility running appropriate software. This data processing facility can be the same or separate from the data processing facility implementing the functionality of distribution generator module 24. Transformer module 30 is operable to retrieve distribution information 26 from distribution information memory 28.

Transformer module 30 functions primarily to transform the distributions generated by distribution generator module 24 into distributions that are appropriate for various spending periods (as defined above) for monetary outflow. The present invention contemplates that, in most instances, the distribution period (e.g., seven days) for a distribution will be less than a spending period (e.g., a month). However, the present invention is not so limited, and the teachings disclosed herein can be used to transform any distribution, regardless of its distribution period, into one that is suitable for a specific spending period.

Each transformed distribution may be segmented into a number of grouping defined by intervals, such as, for example, one to seven days, eight to fourteen days, fifteen to twenty-one days, etc. Preferably, the duration of each interval in the transformed distribution is the same as the distribution period of the distribution from which the transformed distribution was derived. A separate percentage—e.g., fifteen percent, thirty-one percent, four percent, etc.—is specified or provided for each grouping or interval. The percentages are representative of spending or monetary outflow during the corresponding intervals. For example, a first grouping may represent monetary outflow during a first week prior to a specific date; likewise, a second grouping may represent monetary outflow during a second week prior the same date. The percentages across all intervals of the transformed distribution preferably sum to one-hundred percent.

In one embodiment, assuming that a particular spending period is greater than the distribution period for a specific distribution, transformation of the distribution is accomplished as follows. Transformer module 30 determines the number of distribution periods that are contained in the spending period. The distribution is then repeatedly laid out on a time line by the determined number, each distribution offset from the previous distribution by one distribution period. The laid out distributions are summed across the time line and then normalized to produce a distribution for that spending period. This transformation process is shown and described in more detail with reference to FIGS. 8A–8E, and an exemplary flow chart of a method for this transformation is illustrated in FIG. 5.

Each distribution generated by distribution generator module 24 may be transformed multiple times; a separate transformation may be performed for each spending period. For example, a distribution having a distribution period of one week may be transformed into separate distributions for spending periods of two weeks, a month, a quarter, six months, a year, etc. The transformed distributions constitute transformed distribution information 32.

A transformed distribution information memory 34 is coupled to transformer module 30. Transformed distribution information memory 34 can be a relational database and may reside in a suitable storage medium, such as RAM, ROM, disk, tape storage, or other suitable volatile or non-volatile data storage system, which can be the same or separate from the data storage system(s) containing invoice/payment information memory 20, spend information memory 22, and/or distribution information memory 28. Transformed distribution information memory 34 receives, stores, and forwards transformed distribution information 32 generated by transformer module 30.

A spreader module 36 is coupled to spend information memory 22 and transformed distribution information memory 34, and, accordingly, may access spend information 18 and transformed distribution information 32 contained therein. The functionality of spreader module 36 can be performed by any suitable processor, such as a main-frame, file server, work station, or other suitable data processing facility running appropriate software. This data processing facility can be the same or separate from the data processing facility or facilities performing the functionality of distribution generator module 24 and transformer module 30.

Spreader module 36 functions primarily to "spread" a spending amount specified in spend information 18 over an appropriate transformed distribution generated by transformer module 30. In one embodiment, the spending amount is allocated throughout all intervals of the transformed distribution according to the percentages specified for the various intervals. For example, if the spending amount is $100.00 and fifteen percent is provided for a first interval of the transformed distribution, then spreader module 36 allocates $15.00 to the first interval. The spread spending amount provides a more accurate representation or indication of how money was actually distributed during a relevant time frame or specified period of time. An exemplary flow chart for a method of spreading is shown and described in more detail below with reference to FIG. 6. The information generated by spreader module 36 constitutes spread information 38.

A spread information memory 40 is coupled to spreader module 36. Spread information memory 40 may reside in a suitable storage medium, such as RAM, ROM, disk, tape storage, or other suitable volatile and/or non-volatile data storage system, which can be the same or separate from the data storage system(s) containing invoice/payment information memory 20, spend information memory 22, distribution information memory 28, and/or transformed distribution information memory 34. Spread information memory 40 may be a relational database. Spread information memory 40 receives, stores, and forwards spread information 38 generated by spreader module 36.

An analyzer module 42 is coupled to interface 12 and spread information memory 40. The functionality of analyzer module 42 can be performed by any suitable processor, such as a main-frame, file server, work station, or other suitable data processing facility running appropriate software. This data processing facility can be the same or separate from the data processing facility or facilities performing the functionality of distribution generator module 24, transformer module 30, and/or spreader module 36.

Analyzer module 42 can be used to analyze the spread information 38 output by spreader module 36 and stored into spreader information memory 40. In one embodiment, a user of modeling system 10 may interact with analyzer module 42 via interface 12 to view, manipulate, format, reconfigure, process, or otherwise analyze the spread information 38. Furthermore, as needed or desired, the user may input various information to analyzer module 42. For example, the user may input a saving percentage for each dollar spent under a new contract or arrangement.

In one embodiment, analyzer module 42 may be used to calculate or estimate the savings derived under a supply contract which became effective during a particular period of time. In particular, after a spending amount has been spread over the specified period of time, it can be assumed that the amount of spread spending which occurs prior to the effective date of the contract was spent under a prior arrangement; the amount of spread spending which occurs after the effective date may be assumed to be spent under the new contract. A figure for savings under the new contract may be calculated as a percentage of the amount which occurs after the effective date. Thus, if the savings under a new contract is ten percent (10%) for each dollar spent and $2025.00 of a $3525.00 spending amount is spread to the time after the effective date of the contract, then analyzer module 42 may derive a figure of $202.50 ($2025.00×10%) as the amount of savings.

As another example, all of the goods or services that have been provided by a particular supplier may not have been paid for as of the time that a user has requested modeling system 10 to generate a model of spending relating to that supplier. This is especially true for more recent time periods of interest. Analyzer module 42 can be used to adjust or modify the distribution, transformation, or spreading described herein so that the unpaid goods/services are considered or accounted for in the model that is produced. The output of analyzer module 42 comprises modeling information 44 which generally includes information relating to models of spending for one or more time periods of interest.

A modeling information memory 46 is coupled to analyzer module 42 and functions to receive, store, and forward modeling information 44. Modeling information memory 46 may reside in a suitable storage medium, such as RAM, ROM, disk, tape storage, or other suitable volatile or non-volatile data storage system. This data storage system can be the same or separate from the data storage system(s) containing memories 20, 22, 28, 34, and/or 40. Modeling information memory 46 may be a relational database.

Modeling system 10 may operate on one or more computers, shown generally as computer 50. Computer 50 maintains and executes the instructions to generate distributions, transform the distributions, spread spending amounts over the transformed distributions, and analyze the spread spending amounts, as described herein. Computer 50 may comprise any one or a combination of main-frames, file servers, work stations, or the like. As such, computer 50 includes an input device 52, such as a key pad, touch screen, or other device that can accept information. An output device 54, such as a video monitor, audio speaker, or other suitable output device, conveys information associated with the operation of modeling system 10, including digital data, visual information, or audio information. Both input device 52 and output device 54 may include fixed or removable storage media, such as magnetic computer disk, optical disk, CD-ROM, or other suitable media to both receive output from and provide input to modeling system 50. One or more processors 56 and their associated memories execute instructions and manipulate information in accordance with the operation of modeling system 10 described herein.

The present invention contemplates that modeling system 10 may be maintained and operated by any entity which desires an accurate model of its spending. Such entity and/or other parties (e.g., suppliers to the entity) may cooperate to input and receive information from modeling system 10, such as, for example, by providing or supporting direct electronic links for the transfer of information, including, but not limited to, any of invoice information 14, payment information 16, spend information 18, distribution information 26, transformed distribution information 32, spread information 38, and modeling information 44. For widespread access, modeling system 10 may be coupled to the interconnection of computers known as the Internet, for example, by one or a combination of an Integrated Services Digital Network (ISDN) communications line, a hard-wire line, a fiber-optic line, a telephone link, or any other suitable means.

Generally, in operation, invoice information 14, payment information 16, and spend information 18 may be entered at interface 12, for example, by any one or a combination of the entity operating modeling system 10 and its suppliers. Invoice information 14 and payment information 16 are stored in invoice/payment information memory 20, while spend information 18 may be stored in spend information memory 22. Distribution generator module 24 uses invoice information 14 and payment information 16 to generate one or more distributions, which can be stored into distribution memory 28 as distribution information 26. Transformer module 30 transforms each distribution into one or more distributions that are suitable for various spending periods. The transformed distributions are stored as transformed distribution information 32 in memory 34. When a model for a particular time period of interest is desired, spreader module 36 spreads the spending amount for the specified period of time over a suitable transformed distribution retrieved from transformed distribution information memory 34. Spread information memory 40 stores the information output by spreader module 36 as spread information 38. Analyzer module 42 can then be used to manipulate, modify, format, reconfigure, or otherwise analyze the spread information to produce modeling information 44, which is stored into modeling information memory 46 and/or presented to a user via interface 12.

The models generated according to the present invention more accurately reflect the actual break-down of spending over a specified period of time than the single lump sum generated according to previous techniques. Because spending for the specified period of time is spread over the entire period, it can be determined how much benefit has been derived from a new or altered contractual arrangement that became effective during the spending period. Furthermore, the present invention contemplates that various information, such as invoice information 14, payment information 16, and spend information 18, may be updated from time to time so that the models are based on the most recent information.

Figure 3:
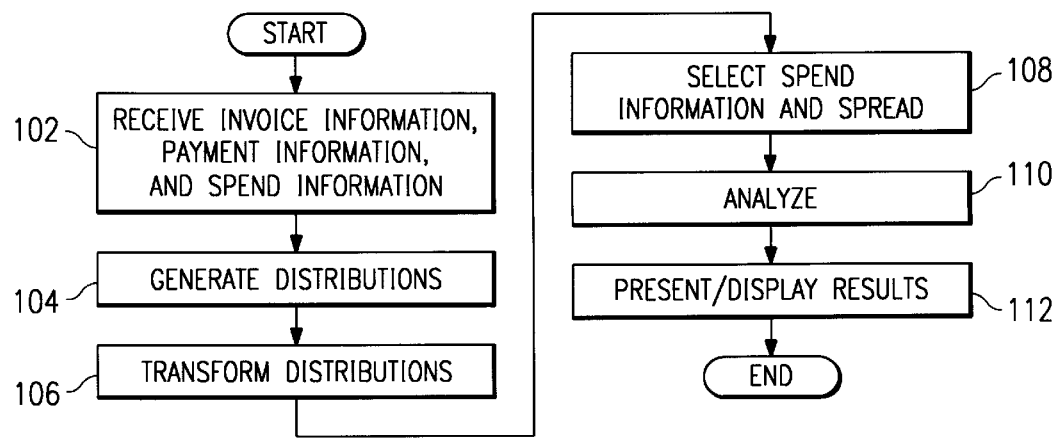
FIG. 3 is a flow chart of an exemplary method for accurately modeling spending, according to an embodiment of the present invention.

FIG. 3 is a flow chart of an exemplary method 100 for accurately modeling spending, according to an embodiment of the present invention. Method 100 can be used to generate a model that accurately reflects spending over a particular period of time and, in one embodiment, may correspond to the operation of modeling system 10. Thus, during the steps of method 100, a user of modeling system 10 may interact with the system, preferably via a suitable input device 52 and/or output device 54 of computer 50. For example, a user can input system commands, invoice information 14, payment information 16, or spend information 18 by pressing appropriate keys (typing) on a key board or "clicking" on an option in a graphical user interface (GUI) display.

Method 100 begins at step 102 where modeling system 10, via interface 12, receives invoice information 14, payment information 16, and spend information 18. The invoice, payment, and spend information 14–18 may be collected or gathered over a period of time, such as several weeks, months, or even years, according to the needs or desires of the concerned party. The invoice information 14 may include any information relating to invoices which are received for services and/or goods that have been delivered or provided by the supplier. Payment information 16 comprises various information relating to payments that have been made in response to the received invoices. Invoice information 14 and payment information 16 are stored into invoice/payment information memory 20. Spend information 18 generally includes information relating to the actual moneys that were disbursed or spent by an entity during one or more particular time periods of interest. Spend information 18 is stored into spend information memory 22.

Distributor generator module 24 retrieves the invoice and payment information and, at step 104, generates one or more distributions. Preferably, at least one distribution is produced for each supplier submitting invoices. Each distribution specifies the historical pattern of the lag between invoice date and payment date for the associated supplier. The distributions may each comprise a number of groupings, where each grouping is defined by a particular interval having the same distribution period, such as, for example, one week. An exemplary method for generating distributions as provided at step 104 is described with reference to the flow chart illustrated in FIG. 4. For each distribution, distribution generator module 24 may also function to produce a graphical depiction, such as the histogram shown in FIG. 7. The distributions are stored into distribution information memory 28 as distribution information 26.

Transformer module 30 retrieves distribution information 26 and, at step 106, transforms each distribution into one or more distributions that are appropriate for various spending periods, such as, for example, two weeks, one month, a quarter, six months, a year, etc. An exemplary method for transforming a distribution as provided at step 106 is described with reference to the flow chart illustrated in FIG. 5 and the graphs illustrated in FIGS. 8A–8E. Transformer module 30 stores the transformed distributions into memory 34 as transformed distribution information 32.

At this point, accurate models of spending for various periods of interest specified in spend information 18 can be generated using the transformed distributions. Thus, at step 108, a specified period of time during which money was spent is selected and the associated monetary amount is spread over an appropriate transformed distribution. An exemplary method for spreading, as provided at step 108, is described below with reference to the flow chart illustrated in FIG. 6. The output of spreader module 36 can be stored into memory 40 as spread information 38.

The spread information 38 may be analyzed at step 110 using analyzer module 42. In one embodiment, a user of modeling system 10 may cooperate with analyzer module 42 via interface 12 to manipulate, configure, or otherwise analyze the spread information to produce a model that reflects spending during the selected specified period of time. Such model is more accurate than those models produced according to prior techniques. The model can be stored into memory 46 as modeling information 44. Furthermore, the model may be presented or displayed to the user via interface 12 at step 112. In one embodiment, analyzer module 42 may calculate or estimate a numerical figure for the savings derived under a contract which became effective during the specified period of time. Specifically, a figure for savings under the contract may be calculated as a percentage of the spending amount which occurs after the effective date.

FIG. 4 is a flow chart of an exemplary method 200 for generating a distribution, according to an embodiment of the present invention. Method 200 may be performed a plurality of times to generate one or more separate distributions for various suppliers. In one embodiment, method 200 corresponds to step 104 of method 100 shown in FIG. 3, and may be performed by distribution generator module 24. Accordingly, during the steps of method 200, a user of modeling system 10 may interact with the system, preferably via input device 52 and/or output device 54 of computer 50, to input, operate upon, retrieve, or view information.

For each distribution to be generated, method 200 begins at step 202 where distribution generator module 24 selects an invoice for a particular supplier from invoice information 14 stored in invoice/payment information memory 20. At step 204, distribution generator module 24 matches the selected invoice with a corresponding payment specified in payment information 16, also stored in invoice/payment information memory 20. In one embodiment, matching may be accomplished using an invoice number that is the common to the selected invoice and one or more payments. It should be understood that, in some cases, multiple payments will be made pursuant to a single invoice. For example, this may occur when one portion of an invoice is initially deemed to be acceptable but another portion of the same invoice is disputed. Payment for the acceptable portion of the invoice could be made immediately, while payment for the initially disputed portion would occur only after the dispute had been resolved. Preferably, distribution generator module 24 identifies and operates, as described herein, on each payment that corresponds to the selected invoice.

Distribution generator module 24 determines the difference in time between the selected invoice and a matching payment at step 206. Such determination can be made by calculating the number of days which transpired between the date of the invoice was received and the date payment was made.

A plurality of groupings may be provided for the various time differentials between invoice and payment. For example, a first grouping may be provided for all time differentials ranging from one to seven days, a second grouping may be provided for all time differentials ranging from eight to fourteen days, a third grouping may be provided for time differentials ranging from fifteen to twenty-one days, etc. The duration for the intervals that define each grouping may be the same. For example, in one embodiment, this duration or distribution period can be one week.

At step 208, distribution generator module 24 increments an appropriate grouping according to the calculated difference in time between the selected invoice and matching payment. For example, if it is determined that payment of a particular invoice was made twelve days after the invoice was received, then distribution generator module 24 may increment a grouping defined by an interval of eight to fourteen days. If multiple payments were made pursuant to the selected invoice, a separate increment of an appropriate grouping is made for each payment.

At step 210, distribution generator module 24 determines whether the currently selected invoice is the last invoice to be considered for the supplier of interest. The present invention contemplates that modeling system 10 may be configured so that only particular invoices and/or matching payments are considered when generating a distribution; for example, in one embodiment, only the most recent invoices (e.g., invoices received within the last three months) are considered. If the currently selected invoice is not the last invoice to be considered, method 200 returns to step 202 where distribution generator module 24 selects another invoice. Distribution generator module 24 repeats steps 202-210 until it determines that the currently selected invoice is the last to be considered, at which point method 200 moves to step 212.

At step 212, distribution generator module 24 determines what percentage of the total number of invoice/payment time differentials is contained within each grouping. For example, the first grouping (defined as one to seven days time difference) may contain 1.8 percent of the total, the second grouping (defined as eight to fourteen days time difference) may contain 9.5 percent of the total, the third grouping (defined as fifteen to twenty-one days) may contain 28.2 percent of the total, etc. This breakdown or segmentation by grouping constitutes a distribution of the invoice to payment time differential, and can be graphically depicted, such as shown in FIG. 7. Method 200 ends.

FIG. 5 is a flow chart of an exemplary method 300 for transforming a distribution, according to an embodiment of the present invention. Method 300 may be performed a number of times on a particular distribution in order to produce various transformed distributions, each of which is appropriate for a particular spending period. In one embodiment, method 300 corresponds to step 106 of method 100 shown in FIG. 3, and may be performed by transformer module 30. During the steps of method 300, a user of modeling system 10 may interact with the system, preferably via input device 52 and/or output device 54 of computer 50.

For each transformation, method 300 begins at step 302 where a distribution specified in distribution information 26 is selected. This distribution may comprise a number of groupings, each of which is defined by a specific interval. For example, a first grouping is defined for an interval of one to seven days, a second grouping is defined for an interval of eight to fourteen days, a third grouping is defined for an interval of fifteen to twenty-one days, etc. The duration or distribution period (e.g., one week) can be the same for each interval. A percentage (e.g., five percent, twenty-two percent, etc.) may be specified for each interval or grouping; preferably the percentages for all groupings in the distribution total to one-hundred percent.

At step 304, transformer module 30 determines the number of distribution periods that are contained within the spending period for which the present transformation is being performed. For example, if the distribution period is one week, then two distribution periods are contained in a spending period of two weeks, approximately four distribution periods are contained in a spending period of one month, approximately twelve distribution periods are contained in a spending period of one quarter, etc.

Transformer module 30 selects the first of the distribution periods contained within the relevant spending period at step 306. At step 308, transformer module 30 lays out the distribution on a time line beginning at the selected distribution period.

At step 310, transformer module 30 determines whether the selected distribution period is the last distribution contained within the spending period. If the selected distribution period is not the last, then method 300 moves to step 311 where the starting point for lay out is offset by one distribution period, after which method 300 returns to step 306 where transformer module 30 selects the next distribution period. The distribution period is then laid out on the same or a separate time line beginning at the new starting point (i.e., offset by one distribution period from the previous lay out).

Transformer module 30 repeats steps 306–311 until it determines that the currently selected distribution period is the last for the relevant spending period, at which point method 300 moves to step 312. At step 312, transformer module 30 sums the percentages of the laid out distributions across the time line(s) to produce an un-normalized distribution for the relevant spending period.

A series of exemplary graphs illustrating the process of steps 306–312 are shown in FIGS. 8A–8E for a spending period of one month and a distribution segmented into distribution periods of one week.

Because multiple distributions, each of which may individually comprise percentages totaling one-hundred percent, were laid out in the iterations of steps 306–312, the resultant un-normalized distribution will have a total percentage that is greater than one-hundred percent. Accordingly, the un-normalized distribution is normalized at step 314 to produce a transformed distribution having a total percentage equal to one-hundred percent.

Like the distribution from which it was derived, the transformed distribution is segmented into groupings defined by time intervals, such as, for example, one to seven days, eight to fourteen days, fifteen to twenty-one days, etc. The total number of groupings in the transformed distribution will be greater than the total number of groupings in the original distribution. Each grouping of the transformed distribution will have its own separate, associated percentage.

The transformed distribution can be used to derive a model of spending for any specified period of time having a duration that is the same as the spending period for which the transformed distribution was generated.

FIG. 6 is a flow chart of an exemplary method 400 for spreading a spending amount, according to an embodiment of the present invention. Method 400 may be performed each time that a model of spending for a particular period of time is desired. In one embodiment, method 400 corresponds to step 108 of method 100 shown in FIG. 3 and may be performed by spreader module 36. During the steps of method 400, a user of modeling system 10 may interact with the system, preferably via input device 52 and/or output device 54 of computer 50, to input, operate upon, retrieve, or view information.

For each spending model that is desired, method 400 begins at step 402 where a specified period of time, such as, for example, November 1996, is selected. A certain amount of spending (i.e., a monetary amount) and a specific spending period are associated with the selected specified period of time. At step 404, spreader module 36 determines the spending period of the selected specified period of time.

Based upon the determined spending period, at step 406, spreader module 36 retrieves from transformed distribution memory 34 a transformed distribution that is appropriate for the specified period of time.

At step 408, spreader module 36 "spreads" the associated monetary amount across this transformed distribution. That is, a portion of the spending amount is allocated to each grouping of the transformed distribution according to the percentage associated with that grouping.

For example, the transformed distribution may comprise thirteen groupings corresponding to various time differentials between invoice and payment. The first grouping may represent monetary outflow during a first week prior to a specific date. Likewise, the second grouping may represent monetary outflow during a second week prior the same date. Similarly, the third through thirteenth groupings may represent monetary outflow during the third through thirteenth weeks, respectively, prior to the specific date. The first through the thirteenth groupings may have associated percentages as follows: one percent, eight percent, thirty-one percent, twenty-five percent, eighteen percent, five percent, three percent, two percent, one percent, two percent, one percent, one percent, and two percent. If the spending amount for the relevant specified period of time comprises $100.00, then spreader module 36 allocates the following respective amounts to the thirteen groupings: $1.00, $8.00, $31.00, $25.00, $18.00, $5.00, $3.00, $2.00, $1.00, $2.00, $1.00, $1.00, and $2.00. Compared to the lump sum provided by prior techniques, this spreading or allocation of the spending amount in accordance with the present invention provides a more accurate model of how money was actually spent throughout a particular period of time.

Methods 100, 200, 300, and 400 have been provided, by way of example only, to illustrate how the present invention can be used to generate or produce accurate models of spending for any specified period of time. It should be understood, however, that the present invention is not limited to such exemplary embodiments.

Figure 7:
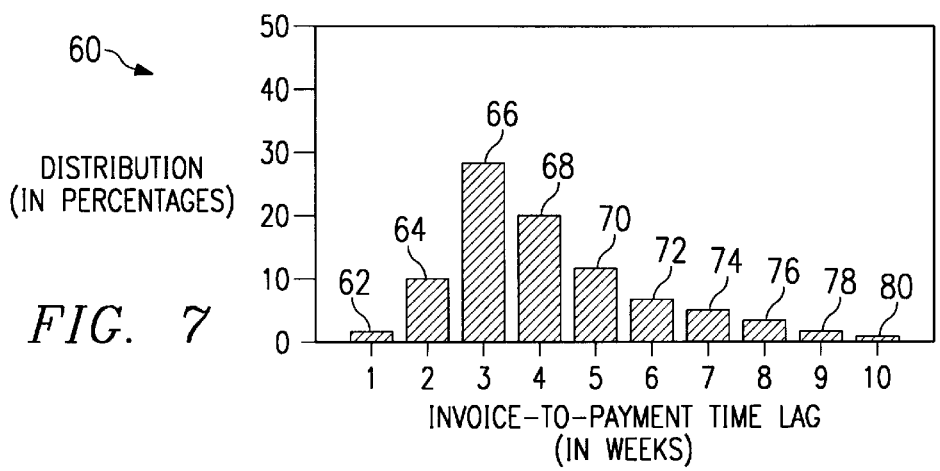
FIG. 7 is an exemplary graph for a distribution, according to an embodiment of the present invention.

FIG. 7 is an exemplary graph 60 for a distribution, according to an embodiment of the present invention. In one embodiment, graph 60 can be generated by distribution generator module 24 of modeling system 10. As shown in FIG. 7, graph 60 comprises a histogram—i.e., a graphic representation of a frequency distribution.

In particular, graph 60 includes a plurality of vertical bars 62–80. Each of bars 62–80 corresponds to a separate grouping which is associated with a particular lag time or interval between the time when an invoice is received and the time when a payment for the invoice is made. For example, bar 62 corresponds to a grouping provided for all instances in which payment for an invoice was made within one to seven days—i.e., during the first week—after the receipt of an invoice. Likewise, bar 64 corresponds to a grouping provided for all instances in which payment for an invoice was made within eight to fourteen days—i.e., during the second week—after the receipt of an invoice. Similarly, bars 66–80 correspond to groupings provided for instances of payment during the third through tenth weeks, respectively. The interval for each grouping has the same duration or distribution period of one week. Although the distribution of graph 60 comprises a total of ten bars representing the same number of groupings, it should be understood that in other embodiments the total number of bars (and represented groupings) can be smaller or larger than ten.

The height of each bar 62–80 is proportional to the number or frequency of instances occurring within the corresponding grouping. Thus, for example, for any number of instances in which payments have been rendered pursuant to various invoices, bar 62 indicates that in approximately two percent of such instances payment was made within the first week. Similarly, bar 66 indicates that in approximately twenty-eight percent of such instances payment was made during the third week. The percentage represented by all bars in graph 60 may sum to one-hundred percent.

Preferably, all of the invoice-payment instances represented within graph 60 are related to a single supplier. The present invention contemplates that a separate graph (similar to graph 60) may be generated for each supplier based upon historical data for that supplier.

FIGS. 8A–8E are a series of exemplary graphs 82–90, respectively, illustrating a transformation of a distribution, according to an embodiment of the present invention. In particular, FIGS. 8A–8E show transformation of a distribution with a distribution period of one week into a distribution for a spending period of one month.

During the transformation process, the number of distribution periods contained within the relevant spending period are determined; in this case, because a month typically contains four weeks, the number is four. The distribution is then repeatedly laid out on the same or separate timelines by the determined number, with each repeat of the distribution being offset from the previous by one distribution period. Thus, as shown in FIGS. 8A–8D, the distribution is laid out four times on separate time lines, with each repeat of the distribution being offset by a distribution period of one week. Specifically, the distribution of graph 84 is offset from the distribution of graph 82 by one week; the distribution of graph 86 is offset from the distribution of graph 84 by one week; and the distribution of graph 88 is offset from the distribution of graph 86 by one week.

Each laid out distribution spans the same number of distribution periods, but not all of the same intervals. With reference to FIGS. 8A–8D, the distribution of graph 82 spans weeks one through ten; the distribution of graph 84 spans weeks two through eleven; the distribution of graph 86 spans weeks three through twelve; and the distribution of graph 88 spans weeks four through thirteen.

Figure 8A:
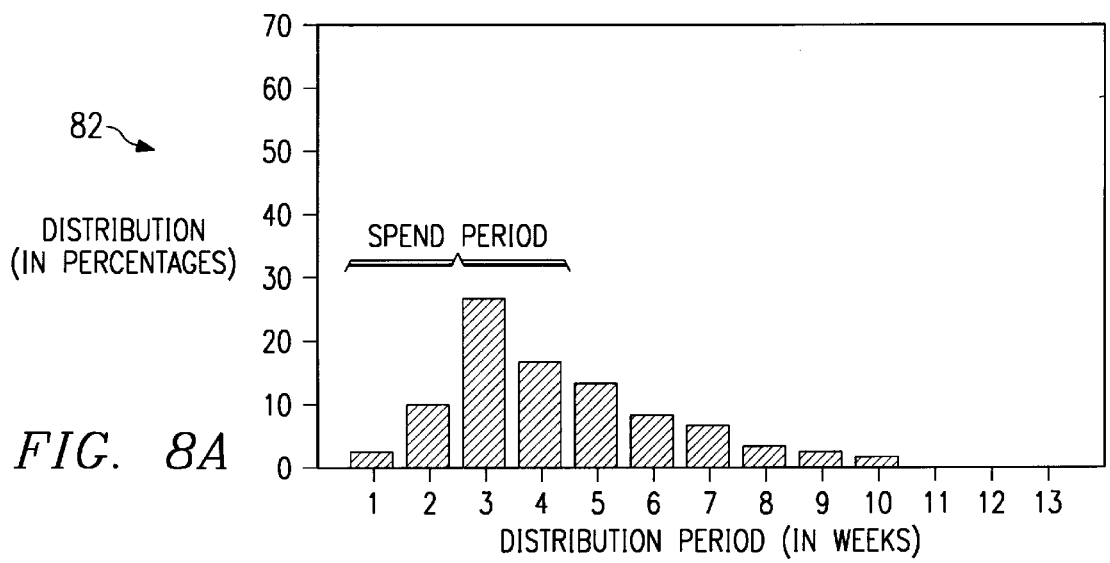
FIGS. 8A–8E are a series of exemplary graphs illustrating the transformation of a distribution, according to an embodiment of the present invention.
Figure 8B:
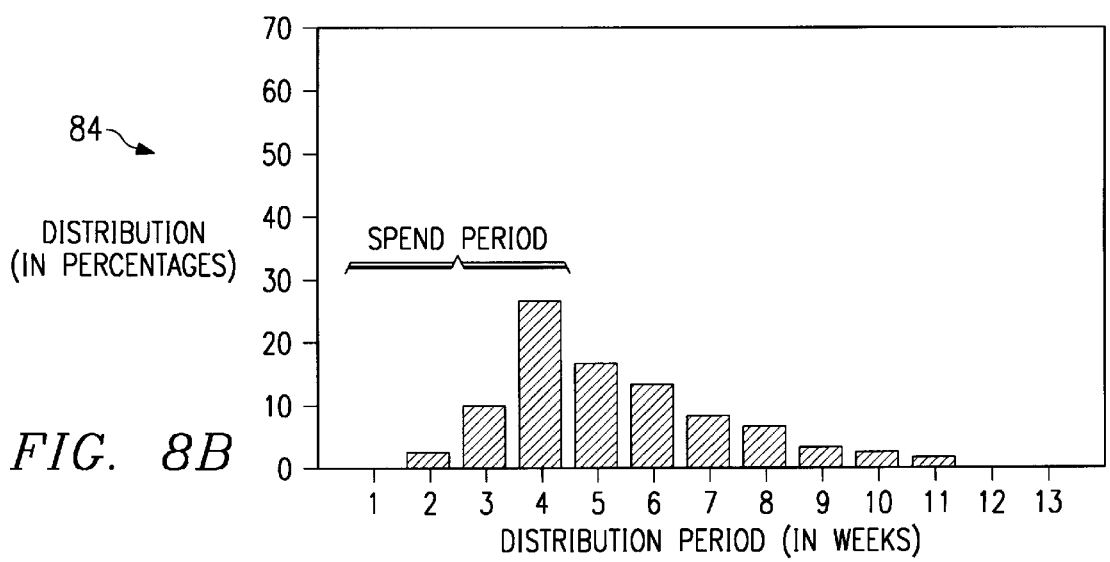
Figure 8C:
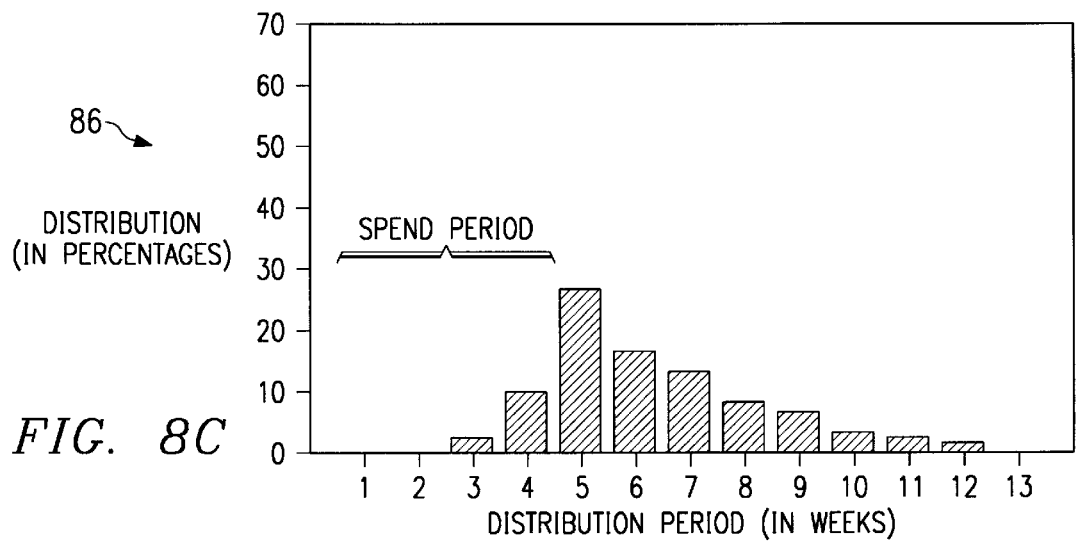
Figure 8D:
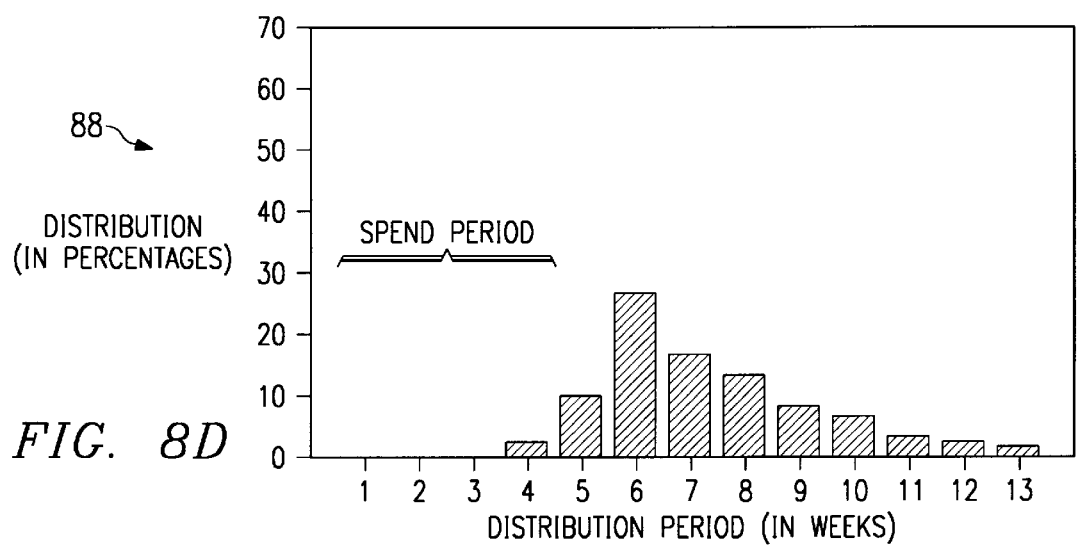
Figure 8E:
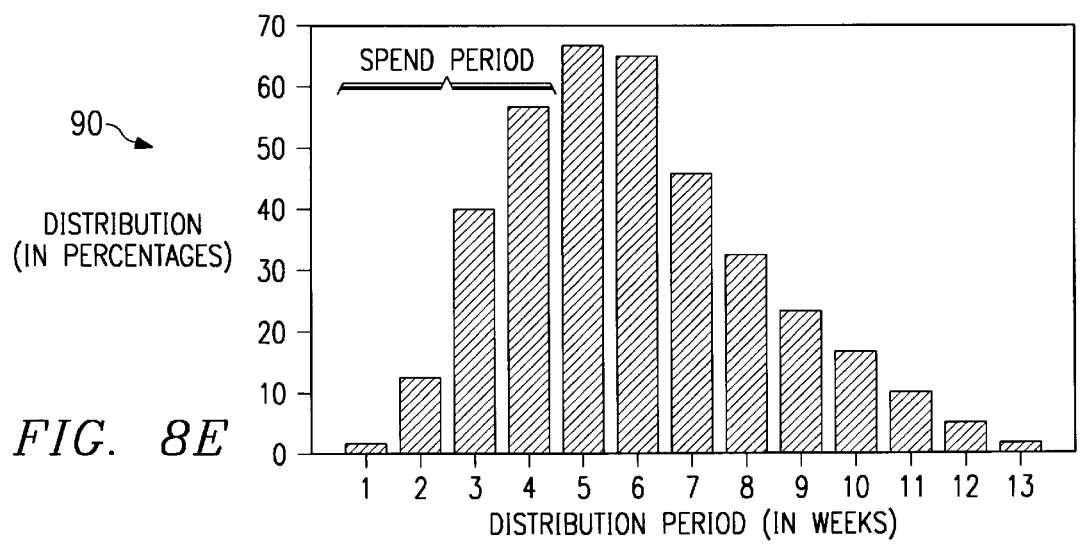

The percentages for the offset distributions are summed across the time line(s) to produce a summed distribution, as shown in graph 90 of FIG. 8E. That is, all percentages (of the distributions illustrated in graphs 82–88) for week one are summed together. Likewise, all percentages (of the laid out distributions) for each of the remaining weeks two through thirteen are summed to produce the summed distribution. This summed distribution may be normalized to produce a transformed distribution for the spending period.

It should be noted that the transformed distribution may extend for a duration that is longer than the spending period; referring to FIG. 8E, the spending period comprises four weeks but the transformed distribution may comprise thirteen weeks.

The transformed distribution can be used in analyzing any relevant specified period of time having a spending period of one month. For example, the transformed distribution can be used to determine the benefit derived under a particular supply contract that became effective at some point during the month of November 1996.

It should be understood that in other embodiments the distribution and spending periods can differ from those shown in FIGS. 8A–8E, but the teachings of the present invention may still be applied. For example, a distribution period can be two weeks and the spending period can be a quarter of a year; in such case, the distribution may be repeated six times in offsets of two weeks, summed, and normalized to produce an appropriated transformed distribution. Generally, transformed distributions can be generated for any spending period. In one embodiment, this process of transformation can be performed by transformer module 30 of modeling system 10.

The present invention has been described above primarily with regard to the calculation of savings under a new supply arrangement; it should be understood, however, that the invention is not so limited. For example, losses under a new supply arrangement may also be derived and documented according to the teachings of the present invention.

Although the present invention and its advantages have been described in detail, it should be understood that various changes, substitutions, and alterations can be made therein without departing from the spirit and scope of the invention as defined by the appended claims.

What is claimed is:

1. An automated method for accurately modeling spending, the method comprising the steps of:

receiving invoice information and payment information;

automatically generating a distribution for a distribution period in response to the invoice information and the payment information, wherein the step of automatically generating a distribution includes matching at least one invoice specified in the invoice information to at least one payment specified in the payment information;

automatically transforming the generated distribution from the distribution period to a spending period;

receiving spend information for the spending period; and automatically spreading a spending amount specified in the spend information over the transformed distribution.

2. The method of claim 1, further comprising the step of analyzing the spread spending amount.

3. The method of claim 1, wherein the step of automatically generating a distribution further comprises the step of determining a difference in time between the matched invoice and payment.

4. The method of claim 1, wherein the step of automatically generating a distribution further comprises the steps of:

selecting at least one invoice specified in the invoice information;

matching each selected invoice to at least one payment specified in the payment information;

determining a difference in time between each matched invoice and payment; and incrementing a grouping according to each determined time difference.

5. The method of claim 4, wherein the step of automatically generating a distribution further comprises the step of determining a percentage for each incremented grouping.

6. The method of claim 1, wherein the step of automatically transforming further comprises the step of determining how many distribution periods of the distribution are contained within a spending period for the specified period of time.

7. The method of claim 1, wherein the step of automatically transforming comprises the step of repeatedly laying out the distribution along a time line.

8. The method of claim 1, wherein the step of automatically transforming further comprises the steps of:

determining how many distribution periods of the distribution are contained within a spending period for the specified period of time;

repeatedly laying out the distribution along a time line in response to the step of determining; and summing the repeatedly laid out distribution.

9. The method of claim 8, further comprising the step of normalizing the sum to produce the transformed distribution.

10. The method of claim 1, further comprising the step of presenting the transformed distribution to a user.

11. The method of claim 1, wherein the step of automatically generating a distribution comprises the step of generating a histogram.

12. The method of claim 1, wherein the step of automatically spreading further comprises the step of determining a spending period of the specified period of time.

13. A system for accurately modeling spending, comprising:

an interface operable to receive spend information for a spending period, invoice information, and payment information; and a processor coupled to the interface and operable to generate a distribution for a distribution period in response to the invoice information and the payment information, transform the generated distribution from the distribution period to the spending period, and spread a spending amount specified in the spend information over the transformed distribution, wherein the processor is further operable to match at least one invoice specified in the invoice information with at least one payment specified in the payment information.

14. The system of claim 13, further comprising a memory coupled to the interface, the memory operable to store the invoice information, payment information, and spend information.

15. The system of claim 13, wherein the processor is further operable to analyze the spread spending amount.

16. The system of claim 13, wherein the interface is further operable to present the spread spending amount to a user.

17. The system of claim 13, wherein the processor is further operable to generate a histogram for the distribution.

18. The system of claim 13, wherein the processor is further operable to determine a spending period of the specified period of time.

* * * * *